July 28, 1936.  A. H. BREITBARTH  2,049,245

DIVIDING PLATE AND PROTRACTOR

Filed Aug. 16, 1935

WITNESSES
Edw. Thorpe
A. L. Kitchin

INVENTOR
August H. Breitbarth
BY
Munn Anderson & Liddy
ATTORNEYS

Patented July 28, 1936

2,049,245

UNITED STATES PATENT OFFICE 2,049,245

DIVIDING PLATE AND PROTRACTOR

August H. Breitbarth, Valparaiso, Ind.

Application August 16, 1935, Serial No. 36,582

5 Claims. (Cl. 33—1)

This invention relates to an improved combination dividing plate and protractor, an object being to provide a single instrument wherein circles may be divided into equal parts quickly, easily and accurately.

Another object of the invention is to provide a combined dividing plate and protractor with guiding grooves and holes in the dividing plate and with shoulders on the center line of the dividing plate for aligning the plate with a horizontal line.

A further object of the invention is to provide a dividing plate and protractor wherein the dividing plate is provided with means indicating the degrees, minutes and seconds, of a circle, together with a body having graduations indicating inches or other standard measurements.

In the drawing—

Figure 1:
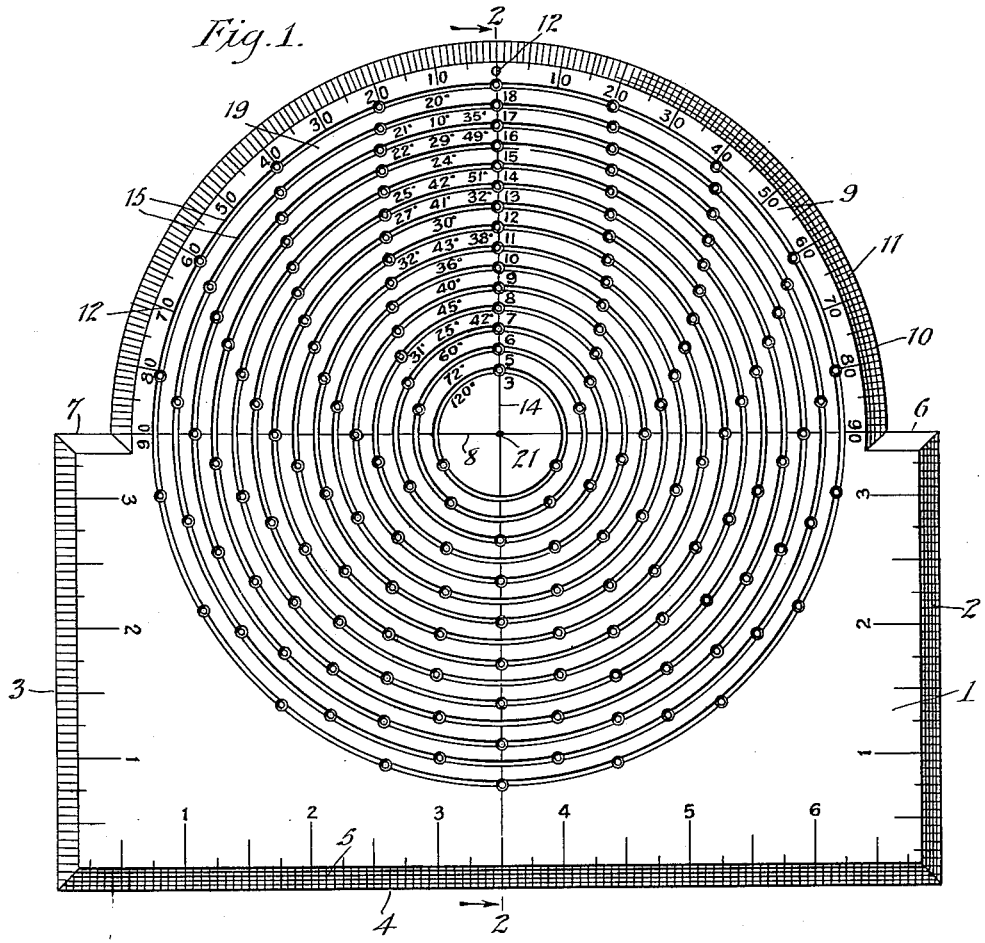
Figure 1 is a plan view of a complete dividing plate and protractor disclosing an embodiment of the invention, the same being ready for use.

Referring to the accompanying drawing by numerals, 1 indicates what may be termed a body having graduations 2 and 3 with straight edges arranged at right angles to a straight edge 4 adjacent which graduations 5 are positioned. These graduations indicate inches and fractions thereof or they could indicate meters or other forms of measurement.

It will be observed that the body 1 is provided with short straight edges 6 and 7 forming what may be termed shoulders, said straight edges being on the central horizontal line 8 of a dividing plate 9. This dividing plate is provided with an arc-shaped edge 10 forming a half-circle, with graduations 11 adjacent thereto, said graduations having suitable indicating means 12 for indicating degrees from the zero point 13 which is on a line 14 at right angles to the line 8. A number of grooves 15 are cut in the face of the dividing plate 9, said grooves extending only partly through the plate and being arranged to present circles. In the accompanying drawing eighteen of these grooves formed annularly have been provided, but it is evident that more or less could be provided without departing from the spirit of the invention.

In forming the device the same may be made of celluloid or other transparent material so that a construction line on a drawing may be seen, and the edges 6 and 7 placed thereon with the line 8 registered with a second construction line at right angles to the first-mentioned construction line. This will accurately position the device so that any circle may be divided up into equal parts, half the circle extending above and half below a horizontal construction line.

In each of the circles there is provided an aperture 16 extending from the bottom of the groove downwardly to the opposite side of the device, and preferably this aperture is provided with an inclined or beveled upper portion 17 and a straight or tubular portion 18. As indicated in the drawing, the outermost groove 15 is provided with eighteen holes so that if the holes in this groove are used the circle will be divided into eighteen equal parts. In the section 19 are arranged the degrees, minutes and seconds, indicating the distance apart of the various apertures 16 in the various grooves 15. In the particular example shown in the accompanying drawing the various apertures 16 are arranged so that there will be one aperture for each groove on the line 14 on the upper or outer half of the dividing plate. On the inner or lower half of the dividing plate there will be apertures on the line 14 only in those grooves which are evenly divided.

Figure 2:
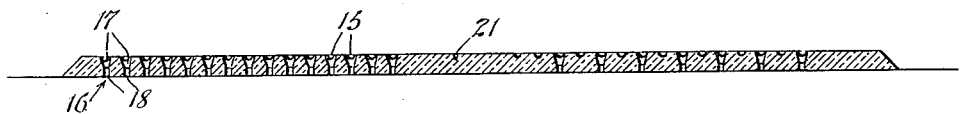
Fig. 2 is a sectional view through Fig. 1 on the line 2—2.
Figure 3:
Fig. 3 is a sectional view similar to Fig. 2 but showing a slightly modified construction.

In the construction shown in Figs. 1 and 2 the device is made of a transparent or substantially transparent substance, but in the construction shown in Fig. 3 the main body of the device is made preferably of metal or other desired material which is opaque. In this form of the invention, however, the central section 20 is made of a transparent substance secured in place in any desired manner whereby the construction lines may be seen therethrough.

In operation, when it is desired to divide a circle into eighteen equal parts, a pencil is placed in one of the apertures 16 so as to make a mark on the paper therebeneath. The pencil is then withdrawn from this aperture but only sufficiently to be out of the aperture but not out of the groove whereby the pencil may be moved along the groove and guided thereby into the next aperture. This is done throughout the entire circle. This prevents the pencil from entering the wrong aperture. If the circle to be divided into eighteen equal parts is larger or smaller than the outer groove 15, the division marks may be extended outwardly or inwardly radially. This may be done by drawing lines from the center 21 radially outwardly through the various dots which have been heretofore provided by a pencil extended through the various apertures in the outermost groove 15. These radial lines may extend out any distance and then a compass used to make the desired sized circle. The circular line will be equally divided into eighteen parts. This may be carried out with any of the grooves and apertures.

In case it should be desired to divide a circle into thirty-four parts with an instrument of the size shown in the accompanying drawing, the device is arranged as heretofore mentioned with the edges 6 and 7 on the same horizontal line and with the line 14 on a vertical line. This will correctly position the device so that the circle will be at the point desired. If a pencil is then inserted successively into the apertures 16 in the second outermost groove, this will produce seventeen equally spaced marks on the paper beneath. The device is then turned around so that the dividing plate 9 will point downwardly instead of upwardly as shown in Fig. 1. The pencil is again inserted into the various apertures or holes 16 in the second outermost groove. This will provide pencil marks half way between the first pencil marks, whereby the circle will be divided into thirty-four equal parts. This same method of using the device may be carried out in regard to all of the grooves having an odd number of holes therein.

In case thirty-six divisions are required the device is arranged as shown in Fig. 1 and pencil marks are made on the paper beneath by inserting a pencil through the various holes 16 in the outermost groove. The protractor is then rotated ten degrees in either direction without moving its central point. The pencil is then inserted through the various apertures or holes 16 in the outermost groove and the circle will be divided into thirty-six equal parts. This practice may be carried out with all grooves having an even number of apertures.

It will of course be understood that a device of the kind described may be made larger or smaller without departing from the spirit of the invention, and a greater number of holes provided in the various grooves so as to divide circles into a greater number of parts.

I claim:

1. A combined dividing plate and protractor, comprising a flat body having a rectangular base merging at one side into a semi-circular extension, the side edges of the base on the side carrying said extension extending from the ends of the base to said extension and presenting guiding shoulders for guiding an operator in placing the device on a construction line, said extension and base being provided with circular grooves having as their center a point on a line constituting an extension of said side edges of said base, said base and extension having apertures merging into said grooves, there being a different number of apertures associated with each groove with the apertures spaced apart so as to divide the respective grooves into equal parts.

2. A device of the character described including a flat body formed with a number of guiding grooves extending only partly through said body, said grooves being arranged concentrically, said body being also provided with a plurality of apertures extending entirely therethrough, said apertures being arranged to merge into the respective grooves, with the apertures of each groove spaced the same distances apart and also spaced to evenly divide each groove into equal parts, the apertures in any one groove being spaced a different distance apart from the apertures in the remaining grooves.

3. A combined dividing plate and protractor, comprising a body merging into an extension, said body and extension being flat, said body and extension being provided with a plurality of annular grooves extending only partly through said body and extension acting as guides for a pencil when the device is in use, said body and extension being provided with a number of apertures for each groove, the apertures in each groove dividing the particular groove into an equal number of parts, each aperture having a comparatively small opening in the face of the device opposite the grooves and an enlarged tapering portion on the face carrying the grooves whereby a pencil slid around the groove may readily enter the respective apertures for producing a mark on a paper arranged therebeneath.

4. An instrument of the character described formed from a flat piece of transparent material provided with a substantially rectangular base having a semi-circular extension at one edge, said extension extending from one end to near the other end of the body so that the edge from which it projects presents comparatively short shoulders, said body and extension having a number of concentric grooves arranged therein and a number of apertures for each groove, said apertures extending entirely through the instrument, and a pair of guide lines on the face of the instrument carrying said grooves, one guide line merging into the edge forming the shoulders and the other guide line being at right angles thereto, said lines crossing at the center of the respective grooves.

5. A combined dividing plate and protractor, comprising a body merging into an extension, said body and extension being flat, said body and extension being provided with a plurality of annular grooves extending only partly through said body and extension acting as guides for a pencil when the device is in use, said body and extension being provided with a number of apertures for each groove, said apertures in each groove dividing the particular groove into an equal number of parts whereby a pencil slid along the respective grooves may readily enter the respective apertures for producing a mark on a paper arranged therebeneath.

AUGUST H. BREITBARTH.